MAGNETIC PARTIAL SWITCHING CIRCUITS
Filed Oct. 24, 1957 3 Sheets-Sheet 1
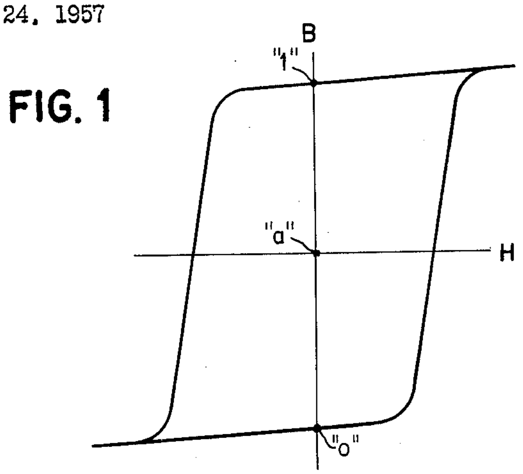
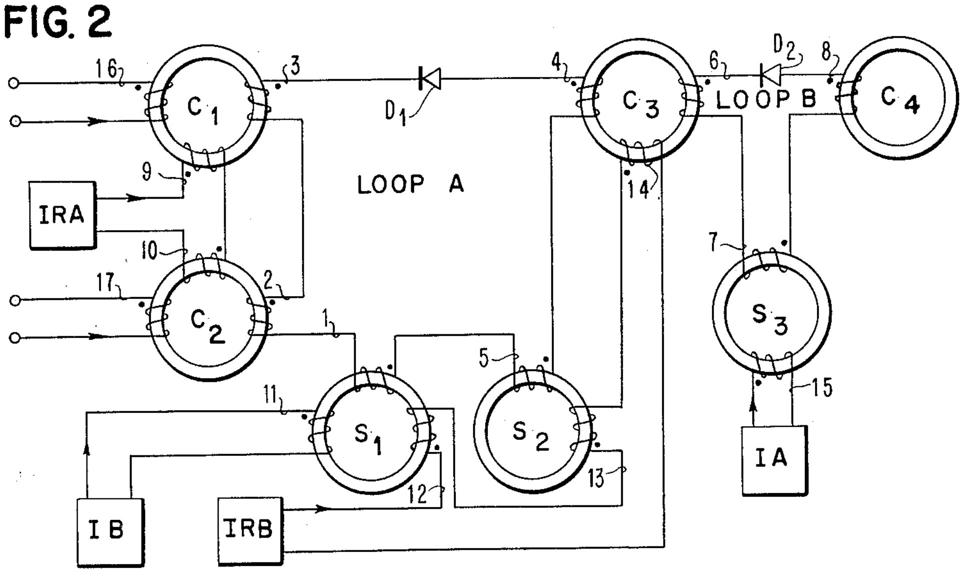
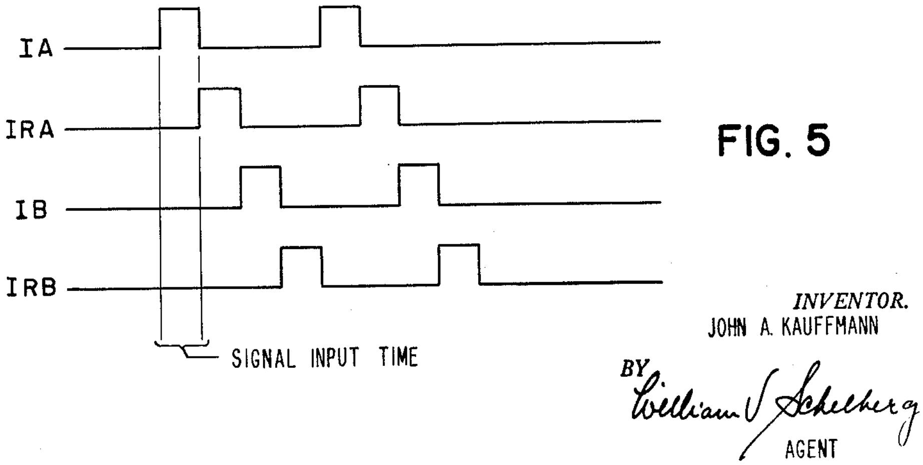
FIG. 5
INVENTOR.
JOHN A. KAUFFMANN
BY William J. Schelberg
AGENT May 14, 1963 J. A. KAUFFMANN 3,090,036

MAGNETIC PARTIAL SWITCHING CIRCUITS

Filed Oct. 24, 1957 3 Sheets-Sheet 2

3,090,036
Patented May 14, 1963

3,090,036

MAGNETIC PARTIAL SWITCHING CIRCUITS

John A. Kauffmann, Hyde Park, N.Y., assignor to International Business Machines Corporation, New York, N.Y., a corporation of New York Filed Oct. 24, 1957, Ser. No. 692,131
24 Claims. (Cl. 340—174)

This invention relates to pulse transfer circuit and more particularly to circuits which are adapted to perform logical operations on binary digits.

Logical circuits are employed throughout accounting equipment and computers for widely different purposes and are variously known as gates, buffers, coincidence circuits and the like. This invention is directed to logical circuitry employing magnetic components operated in accordance with a novel mode which is hereafter termed "partial-switching".

To demonstrate how this "partial-switching" method may be employed, one embodiment of this invention is directed to a Two-Way AND logical circuit, which is a circuit having two input terminals and a single output terminal at which a pulse is produced when and only when a pulse is applied to both input terminals.

To further illustrate how the "partial-switching" method may be utilized another embodiment of this invention is directed to a Three-Way AND logical circuit, which is a circuit having three input terminals and a single output terminal at which a pulse is produced when and only when all three input terminals have a pulse applied to them.

A further embodiment of this invention is directed to a NEITHER NOR circuit as an additional illustration of how this "partial-switching" method may be employed, which circuit has two input terminals and a single output terminal at which a pulse is produced when and only when neither one nor both input terminals have a pulse applied to them.

Electronic computers employ a large number of vacuum tubes, and while such tubes may have long life individually, where large numbers are employed, the likelihood of failure of one tube is quite great. In many instance, the failure of only a single tube may completely disable the unit and as a consequence, there has been a trend, in computer research generally, to replace vacuum tube circuit with components which are more reliable, have longer life and are more economical.

Accordingly, an object of this invention is to provide a new and improved arrangement for switching circuits.

Another object of this invention is to provide a new and improved arrangement for logical circuits employing magnetic cores.

Yet another object of this invention is to provide new and improved AND circuits utilizing magnetic elements for performing the logical operations.

Still another object of this invention is to provide a new and improved NEITHER NOR circuit utilizing magnetic elements for performing the logical operation.

Another object of this invention is to provide logical circuits adapted to receive input pulses over a selectable time interval and to produce an output indication at a selectable time.

Other objects of the invention will be pointed out in the following description and claims and illustrated in the accompanying drawings, which disclose, by way of example, the principle of the invention and the best mode, which has been contemplated, of applying that principle.

In the drawings:

FIGURE 1 is a representation of the hysteresis characteristic obtained for a rectangular magnetic material of type employed.

FIGURE 2 is a circuit diagram of a magnetic core Two-Way AND circuit depicting one form of this invention.

FIGURE 5 illustrates the relative timing of current pulses which are required for operating the circuits of FIGURES 2, 3 and 4.

Referring to FIGURE 1, the curve illustrated comprises a plot of flux density versus applied field for a magnetic core having a substantially rectangular hysteresis characteristic. The opposite remanence states are conventionally employed for representing binary information conditions and are arbitrarily designated as "0" and "1". With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been restored by applying a pulse in the reverse sense to the same or another winding. Such a pulse is hereinafter referred to as a "read" pulse. Should a "1" have been stored, a large flux change occurs with the shift from "1" to "0" conditions with a corresponding voltage magnitude developed on an output winding. On the other hand, should a "0" have been stored, little flux change occurs and negligible signal is developed on the output winding.

For any given core, to obtain either the "1" or the "0" limiting state, as described above, a given amount of flux change must occur within the core. Assume, however, that instead of a volt-time product applied to a given core which is sufficient to fully switch the core to one of the limiting states, only half this given amount is applied. Since only half the given amount of volt-time product is applied, only half the amount of flux change will occur within the core and subsequent to the application of such a signal, the core will attain a "mid-way", or "half-state", of residual flux density which is shown by "*a*" in the FIGURE 1. Similarly then, different increments of volt-time product applied will result in different residual states of flux density intermediate the "1" and "0" limiting states. Consider further, a circuit structure, wherein two cores, each having substantially the same characteristics and having windings with the same number of turns are connected in series. Assume a given volt-time product is applied which in itself is sufficient to fully switch any one of the two cores to a limiting state. This applied signal will then be shared by each of the cores and each core will then attain the "half-state" of residual flux density upon termination of such a signal. In each of the embodiments disclosed below the interconnection of two similar cores, as described, is the particular arrangement utilized to perform logical operations. It is understood however, that further cores may be similarly added to allow further subdivision, or sharing, of a given signal, or the amount of the signal may be varied to accomplish the logic desired.

Figure 3:
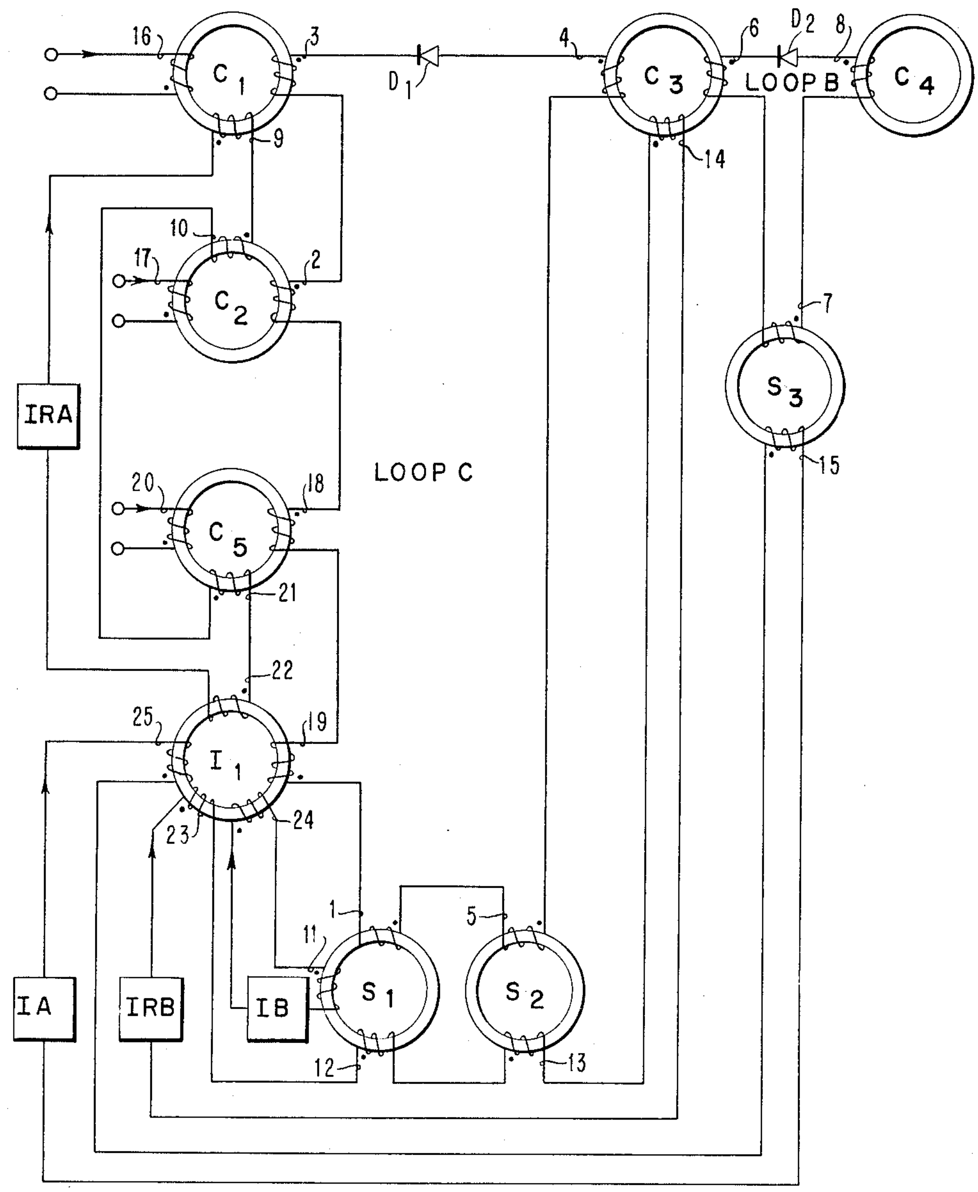
FIGURE 3 is a circuit diagram of a magnetic core Three-Way AND circuit depicting another form of this invention.
Figure 4:
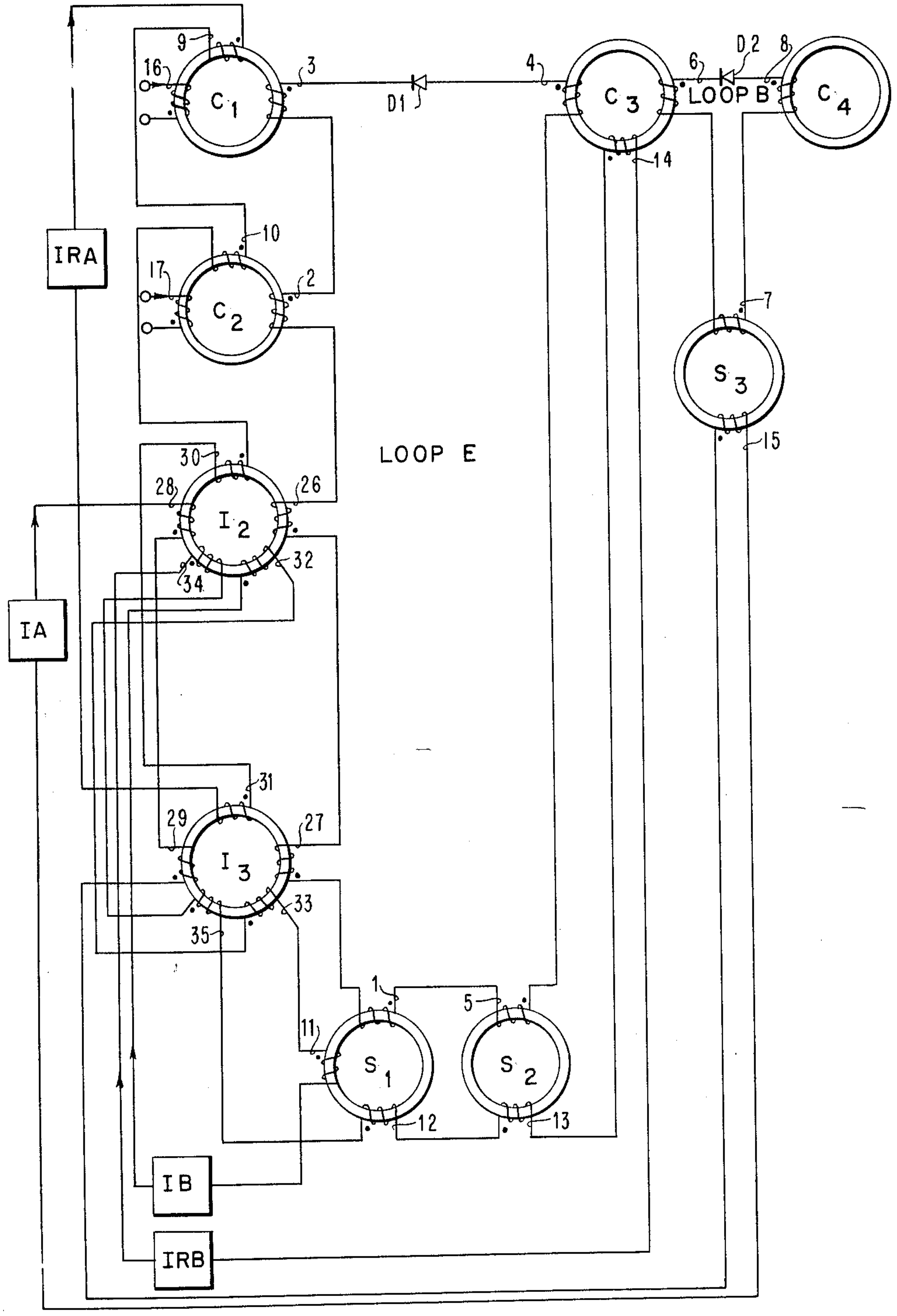
FIGURE 4 is a circuit diagram of a magnetic core NEITHER NOR circuit depicting yet another form of this invention.

A dot is shown adjacent one terminal of each of the windings illustrated in FIGURES 2, 3 and 4, indicating its windings direction. A write pulse is a positive pulse which is directed into the undotted end of the winding terminal which tends to store a "1," while a read pulse is a positive pulse directed into the dotted end of the winding terminal and tends to apply a negative magnetomotive force or store a "0."

The arrangements disclosed employ input and output coupling magnetic cores and inhibit cores arranged intermediate to so called storage magnetic cores which store certain logical information and these arrangements are adapted to be interconnected with each other and with similar type circuitry through such coupling cores.

The function and use of the so called "inhibit cores" is more fully disclosed and claimed in a copending application, Serial No. 689,827, filed October 14, 1957, now abondaned, by John A. Kauffmann and assigned to the same assignee.

The coupling cores and inhibit cores may be fabricated of ferrite materials like the storage cores; however, it is not essential that these cores exhibit the rectangular hysteresis characteristic required of the storage or memory cores as these devices function as variable impedance elements in controlling the transfer of information pulses, as will be more evident from the following description. As shown in the several figures, such interconnecting coupling cores and inhibit cores are illustrated in each of the subsequently described and depicted circuits which are labeled $C_1$, $C_2$, $C_3$, $C_4$, $C_5$, $I_1$, $I_2$ and $I_3$ for clarity. Also shown are two storage cores $S_1$ and $S_2$ which are adapted to store information received. The core $S_1$ is adapted to deliver the information received to another storage core $S_3$ of another logical component. The core $S_2$ is adapted to store information received and to act in conjunction with core $S_1$ to perform the logic subsequently described.

Referring to FIGURE 2, the core $S_1$ is provided with a winding 1 interconnected with an output winding 2 on the core $C_2$, an output winding 3 on the core $C_1$, an input winding 4 on the core $C_3$ through a diode $D_1$ and an output winding 5 on the core $S_2$ which interconnection is hereinafter referred to as loop A. Core $C_3$ is further provided with an output winding 6 which is interconnected with an input winding 8 on the core $C_4$ through a diode $D_2$, wherein the core $C_4$ represents a further coupling core that may be coupled to the storage core $S_3$ through winding 7 series connected to the winding 6. This circuit is hereinafter referred to as loop B.

Storage cores $S_1$ and $S_2$ are adapted to receive information pulses transferred to them through the coupling cores $C_1$ and $C_2$, which information is in turn transferred from the core $S_1$, when the proper inputs are realized, through the coupling core $C_3$ to the following logical stage. The storage core $S_3$ is representative of a storage core in such following stage and thus receives information representing the logical function of Two-Way AND. Input signals are applied to the cores $C_1$ and $C_2$ by means of input windings designated 16 and 17, respectively. The coupling cores $C_1$ and $C_2$ are energized from a clock pulse source $I_{RA}$ while the storage cores $S_1$ and $S_2$ along with coupling core $C_3$ are energized from a clock pulse source $I_{RB}$, with storage core $S_1$ further energized from a clock pulse source $I_B$ and storage core $S_3$ energized from a clock pulse source $I_A$. A winding 9 is provided on the core $C_1$ and a winding 10 is provided on the core $C_2$, which windings are series connected with the source $I_{RA}$. Similarly, a winding 12 on core $S_1$, a winding 13 on core $S_2$ and a winding 14 on core $C_3$ are series connected with the source $I_{RB}$ while a winding 11 on core $S_1$ is connected with the pulse source $I_B$ on the core $S_3$ is connected with the pulse source $I_A$.

The sequence of pulses provided by the several clock pulse sources described above is indicated in FIGURE 5 and may be observed as being the same for each of the hereinafter described circuits with which such sources are adapted to operate.

To explain the operation of the circuits disclosed, consider first, in all circuits described, as an initial condition, that all of the cores shown are at a "0" state or at the lower remanence condition "0" shown in FIGURE 1.

Referring to FIGURE 2, with the initial condition as above described, let us consider its operation for the different conditions which may exist. Assume that at $I_A$ clock pulse time, which is the interval during which input signals are applied to the circuit and designated input time as shown in FIGURE 5, no input is available to either core $C_1$ or $C_2$. Since no input has been received, the flux conditions of the cores in loop A remain the same and a signal from the clock pulse source $I_A$ is directed into the winding 15 on the core $S_3$, which signals tends to read the core $S_3$ in the loop B. Since the core $S_3$ is already in the "0" state, negligible signal will be developed on the output winding 7 and the core remains in the "0" state. After the $I_A$ clock pulse subsides the $I_{RA}$ clock pulse source directs a signal into the windings 9 and 10 on the cores $C_1$ and $C_2$, respectively, which tends to read both cores. Again, since both the cores $C_1$ and $C_2$ are already in the "0" state under the conditions assumed, no flux change occurs. The $I_B$ clock pulse source next directs a signal into the winding 11 on the core S, which signal tends to read this core. Again no appreciable flux change takes place since the core $S_1$ is already in the "0" state. Subsequent to the $I_B$ clock pulse, the $I_{RB}$ clock pulse source directs a signal into the windings 12, 13 and 14 on the cores $S_1$, $S_2$ and $C_3$, respectively, which current tends to read each of these cores. Again, no appreciable flux change takes place since these cores were initially in the "0" state. Under the condition that no information is transferred into the circuit, as described, no information is transferred out due to operation of the clock pulse source.

Assume an input signal is directed into the undotted end of the input winding 16 on the core $C_1$. The core $C_1$ then switches from remanence condition "0" to the "1" state and in so doing induces a voltage on the output winding 3 such that the unmarked end is positive causing a counterclockwise current flow in loop A. This current flow is such as to read the core $C_2$ and write the cores $S_1$, $S_2$ and $C_3$. Since the core $C_2$ is already in the "0" remanence state negligible voltage drop appears across the winding 2. The windings 1 and 5 on cores $S_1$ and $S_2$, respectively, are provided with an equal number of turns and have, in comparison, a greater number of turns than the winding 4 on the core $C_3$. The current, thus, preferentially begins to switch both the cores $S_1$ and $S_2$ to the "1" state, but, since the core $C_1$ is supplying the volt-time product to switch each of the two cores, $S_1$ and $S_2$, each of the cores switch only halfway towards the "1" state and attain a remanence state substantially midway between the "0" and "1" conditions or at point "*a*" as shown in FIGURE 1. At the conclusion of the input pulse, the core $C_1$ stands in the "1" remanence state while the cores $S_1$ and $S_2$ stand in the "half one" remanence state as shown by point "*a*," in FIGURE 1. Next, the $I_{RA}$ clock pulse source directs a signal into the windings 9 and 10 on the cores $C_1$ and $C_2$, respectively, which signal tends to read each of these cores. Since the core $C_2$ is already in the "0" state, it is uneffected, while the core $C_1$, which was previously in the "1" state, is now reset to the "0" state engendering a flux change which induces a voltage on the winding 3 with the undotted end positive tending to cause a clockwise current flow in the loop A which is blocked and dissipated by the high back resistance of the diode $D_1$. At the conclusion of the $I_{RA}$ clock pulse, the $I_B$ clock pulse source directs a signal into the winding 11 on the core $S_1$ which signal tends to read this core. Since the core $S_1$ was previously in "half one" remanence state, or at point "*a*" as shown on the hysteresis loop in FIGURE 1, the core is switched toward the "0" remanence condition inducing a voltage on the output winding 1 with the dotted end positive causing a counterclockwise current flow in the loop A which tends to write the cores $S_2$ and $C_3$. Since the core $S_2$ is in the "half one" state and only a "half one" volt-time product is available from the core $S_1$, this volt-time product is completely dissipated in the preferential switching of the core $S_2$ from the intermediate remanence condition to the "1" state. At the conclusion of the $I_B$ clock pulse the $I_{RB}$ clock pulse source subsequently directs a signal into the windings 12, 13 and 14 on the cores $S_1$, $S_2$ and $C_3$ respectively, and is such as to read each of these cores. Since the cores $S_1$ and $C_3$ are already in the "0" state negligible flux change takes place. The core $S_2$ however, switches from the "1" to the "0" state causing a voltage to be induced on the output winding 5 with the undotted end positive causing a counterclockwise current flow in the loop A. This current tends to write the core $C_3$, read cores $C_1$ and $C_2$, and write the core $S_1$. Since the cores $C_1$ and $C_2$ are already in the "0" state, they are uneffected, while the cores $C_3$ and $S_1$ are held in the "0" state by their $I_{RB}$ drives. This leaves all cores in the "0" state and the circuit is ready for the next cycle of operation, the receipt of a single input having produced no output. It follows from the above, that a single input directed to the winding 17 on the core $C_2$ will have the same affect in that no output signal is produced to write the core $S_3$.

Assume an input signal is now directed into the windings 16 and 17 on the cores $C_1$ and $C_2$ respectively, which signal is such as to write each of the cores. The core $C_1$ in switching from the "0" to the "1" state induces a voltage on the winding 3 with its undotted end positive causing a counterclockwise current flow in the loop A. The core $C_2$ in switching to the "1" state induces a voltage on the output winding 2 with the undotted end positive also causing a counterclockwise current flow in loop A. This counterclockwise current tends to write each of the cores $S_1$, $S_2$ and $C_3$. Again the cores $S_1$ and $S_2$ preferentially start switching from the "0" to the "1" state and since the volt-time product from both the cores $C_1$ and $C_2$ is now available, each of the cores $S_1$ and $S_2$ are completely switched to the "1" state. At the conclusion of the input signals, the cores $C_1$, $C_2$, $S_1$ and $S_2$ are left in the "1" remanence state, with the core $C_3$ in the "0" remanence state. Next, the $I_{RA}$ clock pulse source directs a signal into the windings 9 and 10 on the cores $C_1$ and $C_2$ respectively, which signal tends to read each of the cores. The cores $C_1$ and $C_2$ are switched from the "1" to the "0" state and in so doing, a voltage is induced on the output windings 2 and 3 with the undotted end positive tending to cause current flow in a clockwise direction in the loop A. Current flow in this direction is blocked by the diode $D_1$ and the energy dissipated by its high back resistance. After the cores $C_1$ and $C_2$ have been fully reset to the "0" state by the $I_{RA}$ clock pulse, the $I_B$ clock pulse source now directs a signal into the dotted end of the winding 12 on the core $S_1$ which switches the core from the "1" to the "0" state and in so doing a voltage is induced on the winding 5 on the core $S_1$ with the dotted end positive, causing a counterclockwise current flow in the loop A. This current direction tends to write the cores $S_2$ and $C_3$ while at the same time tends to read the cores $C_1$ and $C_2$. Since the cores $C_1$ and $C_2$ are already in the "0" state, negligible voltage drop appears on their windings 3 and 2, respectively. The core $S_2$ is already in the "1" state so here too there is experienced negligible voltage drop across the winding 5. The core $C_3$, however, is switched from the "0" to the "1" state and in so doing, induces a voltage on the winding 6 with the undotted end positive so as to cause a counterclockwise current flow in loop B. This current direction tends to write both the cores $S_3$ and $C_4$, however, because of the turns ratio, the core $S_3$ is switched to the "1" state in preference to the core $C_4$. Thus, a transfer of information is accomplished only when both inputs are present. Further transfer from core $S_3$ is delivered through the core $C_4$ upon application of the next signal to the core $S_3$ by the $I_A$ clock pulse source. After the information is stored in the core $S_3$ by the $I_B$ clock pulse, the $I_{RB}$ clock pulse resets the remaining cores of the circuit and it is prepared for further input signals. The $I_{RB}$ clock pulse source directs a signal into the windings 12, 13 and 14 to read each of the cores $S_1$, $S_2$ and $C_3$, respectively. The core $S_1$ is already in the "0" state, and therefore remains uneffected. The core $S_2$ is switched from the "1" to the "0" state and in so doing induces a voltage on the winding 5 with the dotted end positive tending to cause a counterclockwise current flow in the loop A. The core $C_3$ in switching from the "1" to the "0" state causes a voltage to be induced on the windings 4 and 6 with their dotted end positive causing a counterclockwise current flow in loop A, and a clockwise current flow in the loop B. The counterclockwise current flowing in the loop A tends to read each of the cores $C_1$ and $C_2$ while tending to write the core $S_1$. Since the cores $C_1$ and $C_2$ are already in the "0" state, they are uneffected while the core $S_1$ is held in the "0" state by virtue of the $I_{RB}$ drive. The clockwise current flow in the loop B is blocked and dissipated by the diode $D_2$ to leave all the cores in the "0" remanence state except the core $S_3$, into which the information has been stored as described above.

The circuit disclosed above may be modified to avoid the need for the diodes $D_1$ and $D_2$ by replacing the diodes with resistors. This would necessitate the utilization of smaller, but longer, reset current clock pulses herein noted as the $I_{RA}$ and $I_{RB}$ clock pulses, as disclosed and claimed in a copending application Serial Number 528,594, filed August 16, 1955, now Patent No. 2,907,987, on behalf of Louis A. Russell, which application is assigned to the same assignee.

Referring to FIGURE 3, the circuit depicted in FIGURE 2, is modified by the addition of a coupling core $C_5$ and an inhibit core $I_1$ and functions as a Three-Way AND circuit. The core $S_1$ is provided with the winding 1 interconnected with the output winding 5 on the core $S_2$, input winding 4 on the core $C_3$, output winding 3 on the core $C_1$ through the diode $D_1$, output winding 2 on the core $C_2$, an output winding 18 on the Core $C_5$ and an output winding 19 on the core $I_1$ which interconnection is hereinafter referred to as loop C. The output winding 6 on the core $C_3$ is interconnected in the same manner as above described for FIGURE 2 and is again referred to as loop B.

Similarly, the storage cores $S_1$ and $S_2$ are adapted to receive information pulses transferred to them through coupling cores $C_1$, $C_2$, and $C_5$, which information in turn is transferred from the core $S_1$, when the proper inputs are realized, through the coupling core $C_3$ to the following logical stage. The storage core $S_3$ is representative of a storage core in such following stage and thus receives information representing the logical function of Three-Way AND. Input signals are applied to the cores $C_1$, $C_2$ and $C_5$ by means of the input winding 16, 17 and input winding 20, respectively. The coupling cores $C_1$, $C_2$, $C_5$ and $I_1$ are energized from the clock pulse source $I_{RA}$ while the coupling cores $C_3$ and $I_1$ along with the storage cores $S_1$ and $S_2$ are energized from the clock pulse source $I_{RB}$. Storage core $S_1$ is further energized from the clock pulse source $I_B$ along with coupling core $I_1$. The storage core $S_3$ is energized from the clock source $I_A$ along with the coupling core $I_1$. A winding 21 is provided on the core $C_5$ and a winding 22 is provided on the core $I_1$ which windings along with the winding 9 on the core $C_1$ and the winding 10 on the core $C_2$ are series connected with the source $I_{RA}$. Similarly a winding 23 is provided on the core $I_1$ with the winding 12 on the core $S_1$, the winding 13 on the core $S_2$ and the winding 14 on the core $C_3$ which windings are series connected with the clock pulse source $I_{RB}$. A winding 24 is provided on the core $I_1$ which winding is series connected to the winding 11 on the core $S_1$ and the clock pulse source $I_B$. A winding 25 is provided on the core $I_1$, which winding is series connected to the winding 15 on the core $S_3$ and clock pulse source $I_A$.

Assume no input is available to the cores $C_1$, $C_2$ or $C_5$. Initially, the $I_A$ clock pulse source directs a signal into the winding 25 on the core $I_1$ and the winding 15 on the core $S_3$. This signal tends to write the core $I_1$ and read the core $S_3$. Since $S_3$ is already in the "0" remanence state negligible flux change will occur, while the core $I_1$ will experience a large flux change in switching from the "0" to the "1" state. As a consequence of the flux change experienced in the core $I_1$, a voltage is developed on the output winding 19 such that the undotted end is positive tending to cause a clockwise current flow in loop C. This clockwise current flow is blocked and its energy is dissipated by the high back resistance of the diode $D_1$. At the conclusion of the $I_A$ clock pulse, the $I_{RA}$ clock pulse source directs a signal into the windings 9, 10, 21 and 22 on the cores $C_1$, $C_2$, $C_5$ and $I_1$, respectively, which signal tends to read each of these cores. The core $I_1$ switches from the "1" to the "0" state, while the cores $C_1$, $C_2$ and $C_5$ experience negligible flux change since they were previously in the "0" state. The core $I_1$ in switching from the "1" to the "0" state, induces a voltage on the output winding 19 with the dotted end positive causing a counterclockwise current flow in the loop C. This direction of current flow tends to write each of the cores $S_1$, $S_2$ and $C_3$. The current preferentially begins to switch the cores $S_1$ and $S_2$ to the "1" state, but since the core $I_1$ is supplying the volt-time product to switch each of the two cores $S_1$ and $S_2$, the cores switch only half way towards the "1" state. At the conclusion of the $I_{RA}$ clock pulse, the core $I_1$ is left in the "0" remanence state while the cores $S_1$ and $S_2$ are left in the "half-one" remanence state shown by point "*a*" in FIGURE 1. Now, the $I_B$ clock pulse source directs a signal into the windings 11 and 24 on the cores $S_1$ and $I_1$, respectively, which signal tends to read each of the cores $S_1$ and $I_1$. Since the core $I_1$ is already in the "0" state, negligible flux change occurs, while the core $S_1$ is switched from the "half-one" to the "0" state. Resetting the core $S_1$ to the "0" state causes a flux change which induces a voltage on the output winding 1 with the dotted end positive causing a counterclockwise current flow in the loop C which tends to write the core $S_2$ and the core $C_3$. Since the core $S_2$ was previously in the "half-one" state, and only a "half-one" volt-time product is available from core $S_1$ in switching to the "0" state, this volt-time product is completely dissipated in the preferential switching of the core $S_2$ to the "1" state. At the conclusion of the $I_B$ clock pulse, the core $S_1$ is left in the "0" remanence state and the core $S_2$ is left in the "1" remanence state. The clock pulse source $I_{RB}$ subsequently directs a signal into the windings 12, 13, 14 and a winding 23 on the cores $S_1$, $S_2$, $C_3$ and $I_1$ respectively, which signal is such as to read each of these cores. Since the core $S_2$ is the only core in the "1" state at this time, it alone switches to the "0" state to cause an appreciable flux change. This flux change induces a volage on the output winding 1 with the dotted end positive which causes a counterclockwise current flow in the loop C which tends to write the cores $C_3$, $I_1$ and $S_1$, while tending to read the cores $C_1$, $C_2$ and $C_5$. The cores $C_1$, $C_2$ and $C_5$ are already in the "0" remanence state and the cores $C_3$, $I_1$ and $S_1$ remain in the "0" state due to the $I_{RB}$ drive on their windings 14, 12 and 23, respectively. All cores are thus left in the "0" state and the circuit is ready for the next cycle of operation, no information has been transferred into the circuit, and, as described, no information is transferred out due to operation of the clock pulse sources.

Assume now an input signal is directed into the undotted end of winding 20 on the core $C_5$. The core $C_5$ then switches from remanence condition "0" to the "1" state and in so doing induces a voltage on the output winding 18 such that the undotted end is positive, while, at the same time, a voltage is developed across the output winding 19 on the core $I_1$ due to the operation of the $I_A$ clock pulse source directing a write signal into the winding 25 on the core $I_1$ as described above. The voltage induced on the winding 19 on the core $I_1$ with the undotted end positive is equal and opposite to the voltage developed on the winding 18 on the core $C_5$ which voltages buck and effectively cancel to allow negligible current flow in loop C. After the $I_A$ clock pulse subsides, the $I_{RA}$ clock pulse source directs a signal into the windings 9, 10, 21 and 22 on the cores $C_1$, $C_2$, $C_5$ and $I_1$, respectively. This signal tends to read each of the cores $C_1$, $C_2$, $C_5$ and $I_1$ and reset them to the "0" state. Since the cores $C_1$ and $C_2$ are already in the "0" state they are uneffected, while the cores $C_5$ and $I_1$ experience a large flux change in switching from the "1" to the "0" state which change induces a voltage on the output windings 18 and 19 on the cores $C_5$ and $I_1$, respectively. The voltage induced on each of the windings 18 and 19 have their dotted end positive which buck and effectively cancel allowing negligible current flow in the loop C. At the termination of the $I_{RA}$ clock pulse, all cores are left in their "0" remanance state. The $I_B$ clock pulse source now directs a read signal into the windings 24 and 11 on the cores $I_1$ and $S_1$, respectively, and since both the cores $I_1$ and $S_1$ are already in the "0" state, they are unaffected and no transfer of information takes place. The $I_{RB}$ clock pulse source subsequently directs a signal into the windings 23, 12, 13 and 14 on the cores $I_1$, $S_1$, $S_2$ and $S_3$, respectively, which tends to switch each of the cores toward the "0" state. Again, since all the cores are already in the "0" state, there is no appreciable flux change and no transfer of information takes place. No information has been transferred, as described above, due to the operation of the clock pulse sources, and all cores are left in the "0" state, thus, the circuit is ready for the next cycle of operation.

It follows from the above, that an input directed to the winding 16 on the core $C_1$, or the winding 17 on the core $C_2$ will have the same effect in that no output signal is produced to write the core $S_3$.

Assume an input is directed into the windings 17 and 20 on the cores $C_2$ and $C_5$, respectively. The cores $C_2$ and $C_5$ in switching from the "0" to the "1" state induce a voltage on their output windings 2 and 18 with the undotted end positive. This voltage is bucked by the core $I_1$ switching from the "0" to the "1" state, initiated by the operation of the $I_A$ clock pulse source as previously described, inducing a voltage on the output winding 19 with the undotted end positive. The algebraic sum of the induced voltages is such that current flows in the counterclockwise direction in the loop C which current starts switching each of the cores $S_1$ and $S_2$ towards the "1" state. Effectively, there is only a volt-time product available from one core to switch each of the cores $S_1$ and $S_2$, therefore both cores switch only to the "half-one" state. At the termination of the $I_A$ clock pulse, the cores $C_2$, $C_5$ and $I_1$ are left in their "1" remanence state, while the cores $S_1$ and $S_2$ are in their "half-one" remanence state. The clock pulse source $I_{RA}$ now directs a read signal into the windings 9, 10, 21 and 22 on the cores $C_1$, $C_2$, $C_5$ and $I_1$, respectively. The core $C_1$ is already in the "0" state and is thus uneffected, while the cores $C_2$, $C_5$ and $I_1$ are each switched from the "1" to the "0" state to cause a flux change in each of the cores to induce a voltage on their output windings 2, 18 and 19, respectively, with their dotted end positive. The algebraic sum of these induced voltages is such that current tends to flow in the clockwise direction in the loop C. This current direction in loop C is blocked and its energy dissipated by the high back resistance of the diode $D_1$. At the termination of the $I_{RA}$ clock pulse, the cores $S_1$ and $S_2$ are in their "half-one" remanence state, while all other cores are in the "0" remanence state. The clock pulse source $I_B$ next applies a read signal into the windings 24 and 11 on the cores $I_1$ and $S_1$ respectively. Since the core $I_1$ is already in the "0" state, it is uneffected, while the core $S_1$ is switched from the "half-one" state to the "0" state to cause a flux change which induces a voltage on the output winding 1 with the dotted end positive causing a counterclockwise current flow in the loop C which tends to write the cores $S_2$ and $C_3$. Again, since the core $S_2$ is in the "half-one" state and only a "half-one" volt-time product is available from the core $S_1$ in switching to the "0" state, the volt-time product is completely dissipated in the preferential switching of the core $S_2$ to the "1" state. At the conclusion of the $I_B$ clock pulse, the core $S_1$ is in the "0" remanence state while the core $S_2$ is in the "1" remanence state. Subsequently, the clock pulse source $I_{RB}$ directs a read signal into the windings 12, 13, 14 and 23 on the cores $S_1$, $S_2$, $C_3$ and $I_1$, respectively. Since the core $S_2$ is the only core in the "1" state at this time, it is switched from the "1" to the "0" state while the cores $S_1$, $C_3$ and $I_1$ are uneffected. The core $S_2$ in switching induces a voltage on the output winding 5 with the dotted end positive which causes a counterclockwise current flow in the loop C. This counterclockwise current flow tends to write each of the cores $C_3$, $I_1$ and $S_1$ while tending to read each of the cores $C_1$, $C_2$ and $C_5$. Since the cores $C_1$, $C_2$ and $C_5$ are already in the "0" state they are uneffected while the cores $I_1$, $S_1$ and $C_3$ are held in the "0" state by virtue of the $I_{RB}$ drive; thus leaving all cores in the "0" state without the transfer of a signal to the core $S_3$ due to the clock pulse sources and readying the circuit for the next cycle of operation.

It follows from the above, that a write pulse directed to any two of the input windings 16, 17 and 20 on the cores $C_1$, $C_2$ and $C_5$ respectively, will have the same effect as described above, in that no output signal is produced to write the core $C_3$.

Assume now an input signal is directed into the input windings 16, 17 and 20 on the cores $C_1$, $C_2$ and $C_5$. Each of the cores will switch from the "0" to the "1" state to induce a voltage on each of the output windings 3, 2 and 18 on the cores $C_1$, $C_2$ and $C_5$, respectively, with their undotted ends positive. At the same time, a voltage is induced, due to the $I_A$ clock pulse source directing a write signal into the winding 25 on the core $I_1$ as previously described, on the output winding 19 with the undotted end positive. The algebraic sum of the induced voltages is such that a counterclockwise current flows in the loop C. This counterclockwise current starts switching the cores $S_1$ and $S_2$, but now, since the effective volt-time product from two cores is available, each of the cores $S_1$ and $S_2$ are completely switched to the "1" state. At the termination of the $I_A$ clock pulse, the cores $C_1$, $C_2$, $C_5$, $I_1$, $S_1$ and $S_2$ are left in the "1" remanence state, and the $I_{RA}$ clock pulse source next directs a read signal into the windings 9, 10, 21 and 22 on the cores $C_1$, $C_2$, $C_5$ and $I_1$, respectively, which switches each of the cores from the "1" to the "0" state. As a result of the switching, a voltage is induced on each of the output windings 3, 2, 18 and 19 on the cores $C_1$, $C_2$, $C_5$ and $I_1$, respectively, with their dotted end positive. The algebraic sum of the induced voltages is such as to tend to cause a clockwise current flow in the loop C which is blocked and its energy is dissipated by the high back resistance of the diode $D_1$. At the termination of the $I_{RA}$ clock pulse, the cores $C_1$, $C_2$, $C_5$ and $I_1$ are left in the "0" remanence state while the cores $S_1$ and $S_2$ are left in the "1" remanence state. The $I_B$ clock pulse source now directs a read signal into the windings 24 and 11 on the cores $I_1$ and $S_1$, respectively, which signal does not effect the core $I_1$ but switches the core $S_1$ from the "1" to the "0" state causing a flux change which induces a voltage on the output winding 1 with the dotted end positive causing a counterclockwise current flow in the loop C. This counterclockwise current flow tends to write the cores $S_2$, $C_3$ and $I_1$ and to read the cores $C_1$, $C_2$ and $C_5$. Since each of the cores $C_1$, $C_2$ and $C_5$ are in the "0" state, they are uneffected. The core $S_2$ is already in the "1" state, and negligible voltage drop appears across the winding

5, while the core $I_1$ is held in the "0" state by virtue of the $I_B$ clock pulse drive. Since the counterclockwise current flow in the loop C is directed into the undotted end of the winding 4 on the core $C_3$, the core $C_3$ switches from the "0" to the "1" state causing a large flux change in the core which induces a voltage on the winding 6 with the undotted end positive. This induced voltage causes a counterclockwise current flow in the loop B which is directed into the undotted end of the winding 7 on the core $S_3$ and completely switches the core $S_3$ to the "1" state. At the conclusion of the $I_B$ clock pulse, the cores $S_2$, $C_3$ and $S_3$ are left in the "1" remanence condition, while the core $S_1$ is left in the "0" remanence condition. Subsequently, the $I_{RB}$ clock pulse source directs a read signal into the windings 23, 12, 13 and 14 on the cores $I_1$, $S_1$, $S_2$ and $C_3$, respectively, which switches the cores $S_2$ and $C_3$ from the "1" to the "0" state, while leaving the cores $I_1$ and $S_1$ uneffected since they are already in the "0" state. Switching the core $S_2$ from the "1" to the "0" state causes a flux change which induces a voltage on the output winding 5 with the dotted end positive. Switching the core $C_3$ from the "1" to the "0" state induces a voltage on the windings 4 and 6 with their dotted end positive. The algebraic sum of the induced voltages on windings 5 and 4 on the cores $S_2$ and $C_3$ is additive to cause a counterclockwise current flow in the loop C. This counterclockwise current flow tends to read the cores $C_1$, $C_2$ and $C_5$ while tending to write the cores $I_1$ and $S_1$. Since the cores $C_1$, $C_2$ and $C_5$ are already in the "0" state they are uneffected, while the cores $I_1$ and $S_1$ are held in the "0" state by virtue of the $I_{RB}$ drive on their respective windings 23 and 12. The voltage induced on the winding 6 on the core $C_3$ tends to cause a clockwise current flow in the loop B which current is blocked and its energy dissipated by the high back resistance of the diode $D_2$. Thus a transfer of information is accomplished only when all three inputs are present, and the output from the core $S_3$ is delivered through the core $C_4$ upon the application of the next $I_A$ clock pulse, while all the cores associated with loop C are left in the "0" state readying the circuit for the next cycle of operation.

Referring to FIGURE 4 the circuit illustrated is basically as depicted in FIGURE 2 with inclusion of a core $I_2$ and a core $I_3$ with their associated windings. A circuit is thereby provided which is adapted to perform the function of NEITHER NOR. The core $S_1$ is provided with the winding 1 interconnected with an output winding 17 and on the core $I_3$, an output winding 26 on the core $I_2$ the output winding 2 on the core $C_2$, the output winding 3 on the core $C_1$, the input winding 4 on the core $C_3$ through the diode $D_1$, and the output winding 5 on the core $S_2$ which interconnection is hereinafter referred to as loop E.

The coupling cores $I_2$ and $I_3$ along with the storage core $S_3$ are energized from the clock pulse source $I_A$, while the coupling cores $C_1$, $C_2$, $I_2$ and $I_3$ are energized from clock pulse source $I_{RA}$, with the coupling cores $I_2$ and $I_3$ along with the storage cores $S_1$ energized from the clock pulse source $I_B$, and the coupling cores $I_2$, $I_3$ and $C_3$ along with the storage cores $S_1$ and $S_2$ energized from the clock pulse source $I_{RB}$. The windings 28, 29 and 15 on the cores $I_2$, $I_3$ and $S_3$, respectively, are series connected with the source $I_A$, while the windings 9, 10, 30 and 31 on the cores $C_1$, $C_2$, $I_2$ and $I_3$ are series connected with the source $I_{RA}$. Similarly, the windings 11, 32 and 33 on the cores $S_1$, $I_2$ and $I_3$, respectively are series connected with the source $I_B$ and the windings 12, 13, 14, 34 and 35 on the cores $S_1$, $S_2$, $C_3$, $I_2$ and $I_3$, respectively, are series connected with the source $I_{RB}$.

Assume, initially, that no input signal is available. Initially, a write signal from the clock pulse source $I_A$, is directed into the windings 28 and 29 on the cores $I_1$ and $I_2$, respectively, and a read pulse is directed into the winding 15 on the core $S_3$. As a consequence of the write signal, the cores $I_2$ and $I_3$ switch from the "0" to the "1" state and in so doing induce a voltage on the output windings 26 and 27, respectively, with the undotted end positive, tending to cause a clockwise current flow in the loop E which is blocked and its energy dissipated by the high back resistance of the diode $D_1$. The read signal does not effect the core $S_3$ since it is already in the "0" state, and therefore negligible flux change occurs in the core. At the termination of the $I_A$ clock pulse, the $I_{RA}$ clock pulse source directs a read signal into the windings 9, 10, 30 and 31 on the cores $C_1$, $C_2$, $I_2$ and $I_3$, respectively, which signal leaves the cores $C_1$ and $C_2$ uneffected since they are already in the "0" state, but resets the cores $I_2$ and $I_3$ from the "1" to the "0" state and in so doing induces a voltage on the output windings 26 and 27 on the cores $I_2$ and $I_3$, respectively, with the dotted end positive, causing a counterclockwise current flow in the loop E. This counterclockwise current flow tends to switch each of the cores $S_1$ and $S_2$ from the "0" to the "1" state and, because the volt-time product of two cores switching is available, both the cores $S_1$ and $S_2$ are fully switched to the "1" state. At the conclusion of the $I_{RA}$ clock pulse, the cores $I_2$ and $I_3$ are left in the "0" remanence state while the cores $S_1$ and $S_2$ are left in the "1" remanence state. The clock pulse source $I_B$ now directs a read signal into the windings 11, 32 and 33 on the cores $S_1$, $I_2$ and $I_3$, respectively. Since the cores $I_2$ and $I_3$ are already in the "0" state, they are uneffected, while the core $S_1$ does switch from the "1" to the "0" state and in so doing induces a voltage on the output winding 1 with the dotted end positive, which voltage causes a counterclockwise current flow in the loop E. This counterclockwise current flow tends to write the cores $S_2$, $C_3$, $I_2$ and $I_3$ while tending to read the cores $C_1$ and $C_2$. Since each of the cores $C_1$ and $C_2$ are already in the "0" state and the cores $I_2$ and $I_3$ are held in the "0" state by virtue of the $I_B$ drive, and the core $S_3$ is already in the "1" state; negligible voltage drop appears on the windings 3, 2, 26, 27 and 5, respectively, allowing the core $C_3$ to switch from the "0" to the "1" state. The core $C_3$ in switching induces a voltage on its output winding 6 with the undotted end positive, to cause a counterclockwise current flow in the loop B. This counterclockwise current flow is directed into the undotted end of the winding 7 on the core $S_3$ and fully switches the core $S_3$ from the "0" to the "1" state. At the termination of the $I_B$ clock pulse, the core $S_1$ is left in the "0" state, while the cores $S_2$, $C_3$ and $S_3$ are left in the "1" state. The clock pulse source $I_{RB}$ subsequently operates to direct a read signal into the windings 34, 35, 12, 13 and 14 on the cores $I_2$, $I_3$, $S_1$, $S_2$ and $C_3$, respectively. Since the cores $I_2$, $I_3$ and $S_1$ are already in the "0" state, they are uneffected. The cores $S_2$ and $C_3$, however, are switched from the "1" to the "0" state which causes a large flux change to occur in each of the cores. This flux change induces a voltage on the windings 5, 4 and 6 on the cores $S_2$ and $C_3$, respectively, with the dotted end positive, to cause a counterclockwise current flow in loop E, and tending to cause a clockwise current flow in loop B. The counterclockwise current flow in loop E tends to read the cores $C_1$ and $C_2$ while tending to write the cores $I_2$, $I_3$ and $S_1$. Since the cores $C_1$ and $C_2$ are already in the "0" state, they are uneffected, while the cores $I_2$, $I_3$ and $S_1$ are held in the "0" state by virtue of the $I_{RB}$ drive. The clockwise current flow in the loop B is blocked and its energy is dissipated by the high back resistance of the diode $D_2$. Thus since neither one, nor both of the possible inputs were available the circuit delivered a signal to the core $S_3$ which signal is delivered through the core $C_4$ in the next cycle of operation when the $I_A$ clock pulse is applied, and all the cores associated with loop E are left in the "0" remanence state readying the circuit for the next cycle of operation.

Assume an input signal is directed into the input winding 17 on the core $C_2$. The core $C_2$ switches from the "0" to the "1" state and in so doing induces a voltage on the output winding 2 with the undotted end positive, while, at the same time, as described in the previous example, the $I_A$ clock pulse source directs a signal into the windings 28 and 29 on the core $I_2$ and $I_3$, respectively, which switches the cores $I_2$ and $I_3$ from the "0" to the "1" state to induce a voltage on the output windings 26 and 27, respectively, with their undotted end positive. The algebraic sum of these induced voltages is such as to tend to cause a clockwise current flow in the loop E. This clockwise current flow is blocked and dissipated by the diode $D_1$. At the termination of the $I_A$ clock pulse, and the input pulse, the cores $C_3$, $I_2$ and $I_3$ are left in the "1" remanence state. These cores are then cleared by the clock pulse source $I_{RA}$ which directs a read signal into the windings 9, 10, 30 and 31 on the cores $C_1$, $C_2$, $I_2$ and $I_3$, respectively, to switch each of the cores $C_2$, $I_2$ and $I_3$, from the "1" to the "0" state. The cores $C_2$, $I_2$ and $I_3$ in switching from the "1" to the "0" state induce a voltage on the output windings 2, 26 and 27, respectively, with their dotted end positive. The algebraic sum of the induced voltages is such as to cause a counterclockwise current flow in the loop E which current is directed into the undotted end of the windings 1 and 5 on the storage cores $S_1$ and $S_2$, respectively, which starts to switch each of these cores to the "1" state. However, since the algebraic sum of the volt-time product available is equal to that of one core switching, the storage cores $S_1$ and $S_2$ each switch to only the "half-one" state. At the termination of the $I_{RA}$ clock pulse, the cores $C_2$, $I_2$ and $I_3$ are left in the "0" remanence state, while the storage cores $S_1$ and $S_2$ are left in the "half-one" remanence state. The clock pulse source $I_B$ now directs a read signal into the windings 32, 33 and 11 on the cores $I_2$, $I_3$ and $S_1$, respectively, which leaves the cores $I_2$ and $I_3$ uneffected since they are already in the "0" state, but switches the core $S_1$ from the "half-one" state toward the "0" state and in so doing induces a voltage on the output winding 1, with the dotted end positive causing a counterclockwise current flow in the loop E. This counterclockwise current flow tends to write the cores $S_2$ and $C_3$, but, since the core $S_2$ is in only the "half-one" state, and only half the volt-time product is available from the core $S_1$, this volt-time product is completely dissipated in preferential switching of the core $S_2$ to the "1" state. At the termination of the $I_B$ clock pulse, all the cores are left in the "0" state except the storage cores $S_2$ which is left in the "1" remanence state. The subsequent clock pulse source $I_{RB}$ directs a read signal into the windings 34, 35, 12, 13 and 14 on the cores $I_2$, $I_3$, $S_1$, $S_2$ and $C_3$, respectively, which signal effects only the core $S_2$ to switch from the "1" to the "0" state, and in so doing induce a voltage on the output winding 5 with the dotted end positive, causing a counterclockwise current flow in the loop E. This counterclockwise current flow is such as to write the cores $C_3$, $I_2$, $I_3$ and $S_1$ while tending to read the cores $C_1$ and $C_2$. The cores $C_1$ and $C_2$ are uneffected since they are already in the "0" state, while the cores $C_3$, $I_2$, $I_3$ and $S_1$ are held in the "0" state by the $I_{RB}$ drive. At the termination of the $I_{RB}$ clock pulse all cores are left in the "0" state. Thus since there was an input available to the core $C_2$, no signal was transferred to the storage core $S_3$ due to clock pulse sources, and the circuit is ready for the next cycle of operation.

It again follows, from the above described operation, that if an input were directed into the winding 16 on the core $C_1$, the effect is the same, in that no output signal is produced to write the core $S_3$.

Assume in the next operation, that an input is directed into the windings 16 and 17 on the cores $C_1$ and $C_2$, respectively. As a result, the cores $C_1$ and $C_2$ switch from the "0" to the "1" state and in so doing induce a voltage on the output windings 3 and 2, respectively, with the undotted end positive. At the same time, as described above, the cores $I_2$ and $I_3$ are also switched from the "0" to the "1" state, due to the operation of the $I_A$ clock pulse source. The cores $I_2$ and $I_3$ in switching to the "1" state induce a voltage on the output windings 26 and 27, respectively, with the undotted end positive. The algebraic sum of the induced voltages is such as to effectively cancel each other and allow negligible current flow. At the conclusion of the input pulses and the $I_A$ clock pulse, the cores $C_1$, $C_2$, $I_2$ and $I_3$ are left in the "1" remanence state. The $I_{RB}$ clock pulse source then directs a read signal into the windings 9, 10, 30 and 31 on the cores $C_1$, $C_2$, $I_2$ and $I_3$, respectively; which switches each of the cores from the "1" to the "0" state to induce a voltage on their output windings 3, 2, 26 and 27, respectively, with the dotted end positive. The algebraic sum of the induced voltages is such as to again effectively cancel and allow negligible current flow in the loop E. At the termination of the $I_{RA}$ clock pulse the cores $C_1$, $C_2$, $C_7$ and $C_8$ are left in the "0" remanence state, and the $I_B$ clock pulse source now directs a read signal into the windings 32, 33 and 11 on the cores $I_2$, $I_3$ and $S_1$, respectively, which has no effect since all the cores are already in the "0" state. Subsequently, the $I_{RB}$ clock pulse source directs a read signal into the windings 34, 35, 12, 13 and 14 on the cores $I_2$, $I_3$, $S_1$, $S_2$ and $C_3$, respectively, which has no effect since again all cores are in the "0" state and again no transfer of energy takes place. Thus, the circuit has performed the logical function of NEITHER NOR.

In the interest of providing a complete disclosure details of one embodiment of the invention wherein ferrite cores are employed, component values and current magnitudes are given below, which, however, is to be understood to be in no way limiting in that other component values and current magnitudes may be employed with satisfactory operation.

With the clock pulse currents $I_A$ and $I_B$ delivering a constant current of 1.9 amperes, the windings 28 and 29 may comprise four turns, the windings 11, 15, 32 and 33 may comprise ten turns; and with the clock pulse currents $I_{RA}$ and $I_{RB}$ delivering 1.1 amperes, the windings 9, 10, 14, 30, 31, 34 and 35 may comprise five turns while the windings 12 and 13 may comprise ten turns. In the coupling circuits interconnecting the storage and coupling cores, the windings 1, 5 and 7 may comprise ten turns, the windings 4, 16, 17 and 18 may comprise five turns and the windings 2, 3, 6, 26 and 27 may comprise twelve turns, with the diodes $D_1$ and $D_2$ of low forward impedance having a sufficient recovery time such as an 1N 270 diode manufactured by the Transitron Company.

In this particular embodiment each of the clock pulse currents $I_A$, $I_{RA}$, $I_B$ and $I_{RB}$ may be a one microsecond pulse having a two-tenths microsecond rise time. Each of the S and C cores may comprise toroids of magnesium-manganese ferrite composition having an outside diameter of 0.100 inch, inside diameter of 0.070 inch and a thickness of 0.120 inch. This thickness may be obtained by stacking four cores each of 0.030 thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A logical "and" circuit comprising a first and a second magnetic storage core each capable of attaining opposite zero and one representative states of residual magnetization and a state intermediate thereto; control winding means on each of said storage cores; a first, a second and a third coupling core; input and output winding means on each of said coupling cores; circuit means including a diode series connecting the output winding means on said first and second coupling cores, said control winding means and said input winding means on said third coupling core; a first, a second and a third clock pulse source adapted to deliver a series of pulses displaced in time; winding means on said first and second coupling cores connected with said first clock pulse source and adapted to drive said first and second coupling cores toward a zero residual state when energized; winding means on said first storage core connected with said second clock pulse source and adapted to drive said first storage core toward the zero state when energized; winding means on said first and second storage cores and said third coupling core connected with said third clock pulse source adapted to drive said first and second storage cores and said third coupling core toward the zero state when energized.

2. A logical "and" circuit comprising a first and a second magnetic storage core each capable of attaining opposite datum and binary one representing states of residual magnetization and a partially switched state intermediate thereto, said cores being formed of material having a substantially rectangular hysteresis characteristic; control winding means on each of said storage cores; a first, a second and a third coupling core; input and output winding means on each of said coupling cores; circuit means including an asymmetrical impedance device connecting the output winding means on said first and second coupling cores, said control winding means and said input winding means on said third coupling core; shift winding means on said first coupling core connected in series with shift winding means on said second coupling core adapted to drive said first and said second coupling cores toward a datum residual state when energized from a first clock pulse source; shift winding means on said first storage core adapted to drive said first storage core toward the datum residual state when energized from a second clock pulse source; shift winding means on said first storage core series connected to shift winding means on said second storage core and shift winding means on said third coupling core adapted to drive said first and second storage cores and said third coupling core toward the datum residual state when energized from a third clock pulse source.

3. A circuit as described in claim 2 including means for energizing said shift winding means comprising said first, second and third clock pulse sources, said sources being actuated in sequence in the order named.

4. A logical "and" circuit comprising a plurality of magnetic storage cores each capable of attaining selective states of residual magnetization intermediate a first and a second limiting state of residual magnetization; a like plurality of input coupling cores; an output coupling core; control winding means on each of said storage cores; input and output winding means on each of said coupling cores; circuit means connecting the output winding means on said input coupling cores; said control winding means on each of said storage cores and the input winding means on said output coupling core; shift winding means on each of said input coupling cores adapted to be energized simultaneously and to drive said input coupling cores toward the first residual state; additional shift winding means on one of said storage cores adapted to drive said one of said storage cores toward the first residual state when energized; further shift winding means on each of said storage cores and said output coupling core adapted to be energized simultaneously and to drive said storage cores and said output coupling core toward the first residual state.

5. A logical "and" circuit comprising a first and a second magnetic storage core each capable of selectively attaining half states of residual magnetization intermediate zero and one representing residual states; control winding means on each of said storage cores; a first, a second, a third and a fourth coupling core; input and output winding means on each of said coupling cores; an inhibit core; output winding means on said inhibit core; circuit means including a diode series connecting the output winding means on said first, second and third coupling cores and said inhibit core, said control winding means on said first and second storage cores and said input winding means on said fourth coupling core; a first, a second, a third and a fourth clock pulse source adapted to deliver a series of pulses displaced in time; winding means on said first, second and third coupling cores and said inhibit core connected with said first clock pulse source and adapted to drive said first, second and third coupling cores and said inhibit core toward a zero residual state when energized; winding means on said inhibit core and said first storage core connected with said second clock pulse source and adapted to drive said inhibit coupling core and said first storage core toward the zero residual state when energized; winding means on said inhibit core, said first and second storage cores and said fourth coupling core connected with said third clock pulse source and adapted to drive said inhibit core, said first and second storage cores and said fourth coupling core toward the zero residual state when energized; winding means on said inhibit core connected with said fourth clock pulse source and adapted to drive said inhibit core to a one residual state when energized.

6. A logical "and" circuit comprising a first and a second magnetic storage core each formed of a magnetic material having a substantially rectangular hysteresis characteristic and capable of selective attainment of half states of residual magnetization intermediate first and second residual states; control winding means on each of said storage cores; a first, a second, a third and a fourth coupling core; input and output winding means on each of said coupling cores; an inhibit core; output winding means on said inhibit core; circuit means including an asymmetrical impedance device connecting the output winding means on said first, second and third coupling cores and said inhibit core, said control winding means on said first and second storage cores and said input winding means on said fourth coupling core; shift winding means on each of said first, second and third coupling cores series connected with shift winding means on said inhibit core adapted to drive said first, second and third coupling cores and said inhibit core toward a first residual state when energized from a first clock pulse source; shift winding means on said inhibit core series connected with shift winding means on said first storage core adapted to drive said inhibit core and said first storage core toward the first residual state when energized from a second clock pulse source; shift winding means on said inhibit core series connected with shift winding means on each of said first and second storage cores and shift winding means on said fourth coupling core adapted to drive said inhibit core, said first and second storage cores and said fourth coupling core toward the first residual state when energized from a third clock pulse source; shift winding means on said inhibit core adapted to drive said inhibit core toward a second residual state in a direction opposite to said first state when energized from a fourth clock pulse source.

7. A circuit as described in claim 6 including means for energizing said shift winding means comprising said first, second, third and fourth clock pulse sources wherein said sources are actuated in sequence in the order named.

8. A logical "and" circuit comprising a first and a second magnetic storage core each of said cores capable of selective attainment of states of residual magnetization intermediate a first and a second limiting state of residual magnetization; control winding means on each of said storage cores; a first, a second, a third and a fourth coupling core; input and output winding means on each of said coupling cores; an inhibit core; output winding means on said inhibit core; circuit means including an asymmetrical impedance device coupling the output winding means on said first, second and third coupling cores and said inhibit core, said control winding means on said first and second storage cores and said input winding means on said fourth coupling core; shift winding means on each of said first, second and third coupling cores and said inhibit core adapted to be energized simultaneously and to drive said first, second and third coupling cores and said inhibit core toward the first residual state when energized; additional shift winding means on said inhibit core and shift winding means on said first storage core adapted to be energized simultaneously and to drive said inhibit core and said first storage core toward the first residual state when energized; further shift winding means on said inhibit core; on each of said storage cores and said fourth coupling core adapted to be energized simultaneously and to drive said inhibit core, each of said storage cores and said fourth coupling core toward the first residual state when energized; and shift winding means on said inhibit core adapted to drive said inhibit core toward the second residual state.

9. A logical "neither nor" circuit comprising a first and a second magnetic storage core each capable of selectively attaining half states of residual magnetization intermediate zero and one representing residual states; control winding means on each of said storage cores; a first, a second and a third coupling core; input and output winding means on each of said coupling cores; a first and a second inhibit core; output winding on each of said inhibit cores; circuit means including a diode series connecting the output winding means on each of said first and second coupling cores and said inhibit cores, said control winding means on each of said storage cores and said input winding means on said third coupling cores; a first, a second, a third and a fourth clock pulse source adapted to deliver a series of pulses displaced in time; winding means on said first and second coupling cores and said first and second inhibit cores connected with said first clock pulse source and adapted to drive said first and second coupling core and said first and second inhibit core toward a zero residual state when energized; winding means on said first and second inhibit cores and said first storage core connected with said second clock pulse source and adapted to drive said first and second inhibit cores and said first storage core toward the zero residual state when energized; winding means on said inhibit cores, said storage cores and said third coupling core connected with said said third clock pulse source and adapted to drive said inhibit cores, said storage cores and said third coupling core toward the zero residual state when energized; winding means on said inhibit cores connected with said fourth clock pulse source and adapted to drive said inhibit cores toward a one residual state when energized.

10. A logical "neither nor" circuit comprising a first and a second magnetic storage core each of said cores made of material having a substantially rectangular hysteresis characteristic and capable of attaining half states of residual magnetization; intermediate first and second residual states; control winding means on each of said cores; a first, a second and a third coupling core; input and output winding means on each of said coupling cores; a first and a second inhibit core; output winding means on each of said inhibit cores; circuit means including an asymmetrical impedance device connecting the output winding means on said first and second coupling cores and said inhibit cores, said control winding means on said storage cores and said input winding means on said third coupling core; shift winding means on each of said first and second coupling cores series connected with shift winding means on each of said inhibit cores adapted to drive said first and second coupling cores and said inhibit cores toward a first residual state when energized from a first clock pulse source; shift winding means on each of said inhibit cores series connected with shift winding means on said first storage core adapted to drive said inhibit cores and said first storage core toward the first residual state when energized from a second clock pulse source; shift winding means on each of said inhibit cores series connected with shift winding means on each of said storage cores and said third coupling core adapted to drive each of said inhibit cores, said storage cores and said third coupling core toward the first residual state when energized from a third clock pulse source; and shift winding means on said first inhibit core series connected with shift winding means on said second inhibit core adapted to drive said first and second inhibit cores toward a second residual state in a direction opposite from said first residual state when energized from a fourth clock pulse source.

11. A circuit as described in claim 10 including means for energizing said shift winding means comprising said first, second, third and fourth clock pulse sources wherein said sources are actuated in sequence in the order named.

12. A magnetic core circuit comprising a plurality of magnetic storage cores each capable of retaining selective states of residual magnetization intermediate a first and a second limiting state of residual magnetization; control winding means on each of said cores; a like plurality of inhibit cores; output windings on each of said inhibit cores; a like plurality of input coupling cores; an output coupling core; input and output winding means on each of said coupling cores; circuit means including an asymmetrical impedance device connecting the ouput winding means on said input coupling cores and said inhibit cores, said control winding means on each of said storage cores and said input winding means on said output coupling core; shift winding means on each of said input coupling cores and each of said inhibit cores adapted to be energized simultaneously and to drive said input coupling cores and said inhibit cores toward the first residual state; additional shift winding means on each of said inhibit cores and one of said storage cores adapted to be energized simultaneously and to drive said inhibit cores and said one of said storage cores toward the first residual state; further shift winding means on each of said inhibit cores and said storage cores and said output coupling core adapted to be energized simultaneously and to drive said inhibit cores, said storage cores and said output coupling core toward the first residual state; and shift winding means on each of said inhibit cores adapted to be energized simultaneously and to drive said inhibit cores toward the second residual state.

13. A logical information transfer circuit including a plurality of magnetic storage means each capable of attaining selective states of residual magnetization intermediate a first and a second limiting state; control means on each of said storage means; a plurality of input means; circuit means series connecting said control means and coupling said input means; signal means operably connected with said input means; pulse means connected with said storage means; said pulse means being operable to apply a first pulse to said storage means and establish said storage means in the first limiting residual state; said signal means thereafter being operable to selectively apply a signal to said input means and read in information by establishing said storage means in a selective residual state; said pulse means being operable to apply a second pulse to said storage means and establish said first storage means in the first limiting residual state and to produce an output in said control means indicative of the magnetization necessary to establish all of said storage means in said second limiting residual state.

14. A circuit as described in claim 13 wherein said storage means comprise magnetic storage cores.

15. An information controlling device including a first and a second magnetic storage core each capable of attaining selective half states of magnetization intermediate and including a zero and a one limiting state; each of said cores having a reset winding and a control winding thereon; circuit means including a signal means series connecting said control windings; means for selectively energizing said reset windings to establish said cores in the zero residual state; said signal means adapted to apply a signal to said control windings to read in a bit of information and selectively establish said cores in the intermediate and one limiting states; and means for resetting said first core to the zero residual state to produce an output in said control winding means the magnitude of which is indicative of the magnetization force necessary to establish both of said cores in the one residual state.

16. An information controlling device including a plurality of magnetic storage cores each capable of attaining selectively residual states of magnetization intermediate and including a first and a second limiting residual state; winding means on each of said cores; signal means operably connected with said winding means; said signal means comprising first means selectively applying a first signal to said winding means to simultaneously establish said cores in the first residual state; second means applying a second signal to said winding means to read in information by establishing each of said cores in a selective residual state, and third means applying a third signal to said winding means to reset at least one of said cores to the first residual state and produce an output in a series connected winding coupling each of said cores the magnitude of which is indicative of the magnetizing force necessary to establish all of said cores in the second residual state.

17. An information controlling device including a plurality of magnetic storage cores each of said cores capable of attaining selective residual states of magnetization intermediate and including a first and a second limiting residual state and formed of material having a substantially rectangular hysteresis characteristic; winding means on each of said cores; signal means operably connected with said winding means; said signal means comprising first means adapted to apply a first signal to said winding means to simultaneously establish each of said cores in the first limiting state, second means adapted to apply a second signal to further ones of said winding means to cause all of said cores to assume a selective residual state in representing said information, and third means adapted to apply a third signal to another one of said winding means on at least one of said storage cores to reset at least said one of said storage cores to the first limiting state and produce an output in said winding means the magnitude of which is indicative of the magnetizing force necessary to establish all of said cores in the second limiting state.

18. In an information handling circuit, a first and a second magnetic core made of material exhibiting first and second limiting stable states of remanent flux density, winding means inductively coupled to said cores, means for energizing said winding means during a first and a second interval of time comprising, first means energizing said winding means during the first interval of time for establishing both said cores in a similar stable state of flux density intermediate said limiting states which conjointly defines said information, and second means energizing said winding means during said second interval of time for establishing said first core in said first limiting state and to read out said information.

19. In a circuit, a first and a second magnetic core each made of magnetic material exhibiting different states of remanence intermediate and including a first and a second limiting state, a plurality of windings on said cores, means for energizing said windings during a first interval of time for writing in a binary value and during a second interval of time for reading out said binary value comprising, first means energizing said plurality of windings during said first interval of time for establshing both said cores in intermediate remanence states, said cores in said intermediate remanence states jointly representing said binary value, and second means thereafter energizing said plurality of windings during the second interval of time for establishing both said cores in limiting remanence states to read out said binary value.

20. The circuit as set forth in claim 19, wherein both said cores are established in the same remanence state during the first interval of time.

21. In a circuit, a first and a second magnetic core each made of material exhibiting appreciable remanence, each said core capable of attaining different states of remanence intermediate and including a first and a second limiting state, a plurality of windings inductively associated with each said core, means for energizing the windings of each core during a first, a second and a third interval of time comprising, first means energizing said windings during said first interval of time for establishing said cores in said first limiting state, second means energizing said windings during the second interval of time for writing in a binary bit of information and establishing both said cores in intermediate states of remanence, and third means energizing said windings during the third interval of time for establishing both said cores in a limiting state of remanence whereby the state established in said cores during the second interval of time and thus the binary information represented thereby is read out.

22. In a circuit, a first and a second magnetic core, said cores formed of material exhibiting appreciable remanence, each said core adapted to assume a first, a second and a third stable remanence state, where at least one of the stable states of each core is a state other than a limiting state and another of said states is a limiting state, one of the stable states of said first core and one of the stable states of said second core constituting a first combinatorial state for both cores, another of the stable states of said first core and another of the stable states of said second core constituting a second combinatorial state for both said cores, the remaining stable state of said first core and the remaining stable state of said second core constituting a third combinatorial state for both said cores, winding means coupling said cores, means for energizing said winding means during a first and a second interval of time, said last means energizing said winding means during the first interval of time for establishing said cores in either said first or second combinatorial state to represent a binary value and said last means energizing said winding means during the second interval of time for establishing said cores in the third combinatorial state to read out said binary value.

23. The circuit as set forth in claim 22, wherein the first and second stable states of both said cores are opposite limiting states of flux remanence.

24. In a circuit, a first and a second magnetic core, said cores formed of material exhibiting appreciable remanence, each said core adapted to assume a first, a second and a third stable remanence state, where at least one of the stable states of each said core is a state other than a limiting state and another of said states is a limiting state, one of the stable states of said first core and one of the stable states of said second core constituting a first combinatorial state for both cores, another of the stable states of said first core and another of the stable states of said second core constituting a second combinatorial state for both said cores, the remaining stable state of said first core and the remaining stable state of said second core constituting a third combinatorial state for both said cores, winding means coupling said cores, means for energizing said winding means during a first, a second and a third interval of time; said last means energizing said winding means during said first interval of time for establishing said cores in the first combinatorial state, said last means energizing said winding means during the second interval of time for establishing said cores in the second combinatorial state whereby the joint states of said cores represent a binary value, and said last means energizing said winding means during the third interval of time for establishing said cores in the third combinatorial state to thereby read out said binary value.

References Cited in the file of this patent

UNITED STATES PATENTS

| | | |
|---|---|---|
| 2,753,545 | Lund | July 3, 1956 |
| 2,768,312 | Goodale et al. | Oct. 23, 1956 |
| 2,931,014 | Buchholz et al. | Mar. 29, 1960 |